United States Patent [19]

Berk

[11] 4,332,365
[45] Jun. 1, 1982

[54] FLEXURE MOUNTED GIMBAL SUPPORT ASSEMBLY

[75] Inventor: Edmund C. Berk, Danvers, Mass.

[73] Assignee: The United States of America as represented by the Secretary of the Navy, Washington, D.C.

[21] Appl. No.: 84,274

[22] Filed: Oct. 12, 1979

[51] Int. Cl.³ ............................................. G01C 19/18
[52] U.S. Cl. ................................. 248/544; 248/186; 248/604; 74/5 F; 74/5.7; 308/2 A
[58] Field of Search ....................... 248/160, 186, 289.3, 248/544, 604, 606, 638, 417, 418, 573; 308/2 A, 26; 74/5 F, 5.7; 310/90

[56] References Cited

U.S. PATENT DOCUMENTS

| | | | |
|---|---|---|---|
| 1,145,025 | 7/1915 | Leavitt | 74/5.7 X |
| 1,919,484 | 7/1933 | Saurer | 248/544 |
| 2,750,137 | 6/1956 | Cunningham | 248/604 |
| 2,756,013 | 7/1956 | Cunningham | 248/606 |
| 2,757,050 | 7/1956 | Weber et al. | 308/2 A |
| 2,771,778 | 11/1956 | Ryberg | 74/5 F |
| 2,936,141 | 5/1960 | Rapata | 248/604 |
| 3,119,607 | 1/1964 | Wilcox et al. | 267/154 |
| 3,185,099 | 5/1965 | Spring | 248/606 X |
| 3,713,618 | 1/1973 | Hendrickson | 248/417 |
| 3,722,296 | 3/1973 | Hurlburt | 308/2 A |

Primary Examiner—William H. Schultz
Attorney, Agent, or Firm—R. S. Sciascia; Charles D. B. Curry; William C. Daubenspeck

[57] ABSTRACT

A flexure mounted gimbal support assembly for limited angular rotation having a flexure assembly of an open web construction mounted between a platform and a gimbal assembly via a ball bearing assembly. The flexure assembly has a plurality of flexure elements having a high flexibility so that the flexure assembly provides less resistance to rotational motion than the static ball-bearing friction over the limited angular rotation. A slip-ring assembly is mounted inboard of the flexure assembly to provide direct connection to angle measuring resolvers and direct-drive dc torque motors, which eliminates slip-ring brush-on-ring effects and torque motor brush friction effects.

5 Claims, 6 Drawing Figures

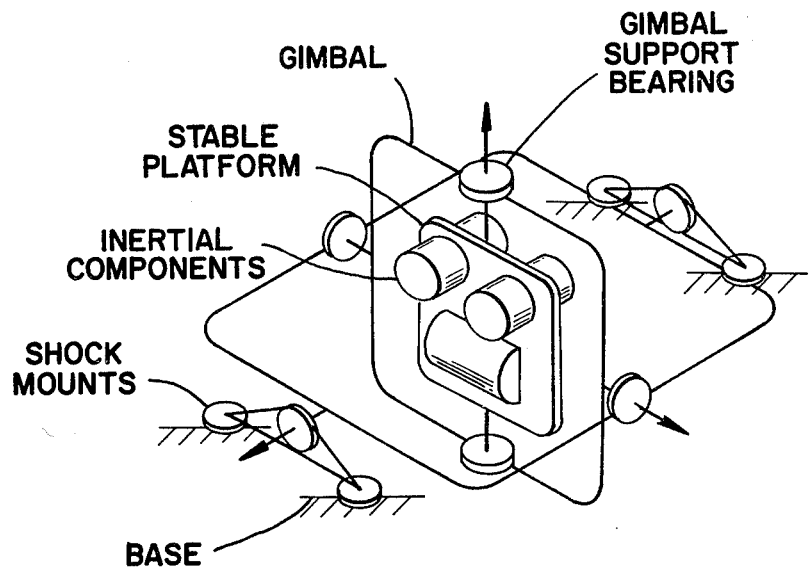
FIG_1
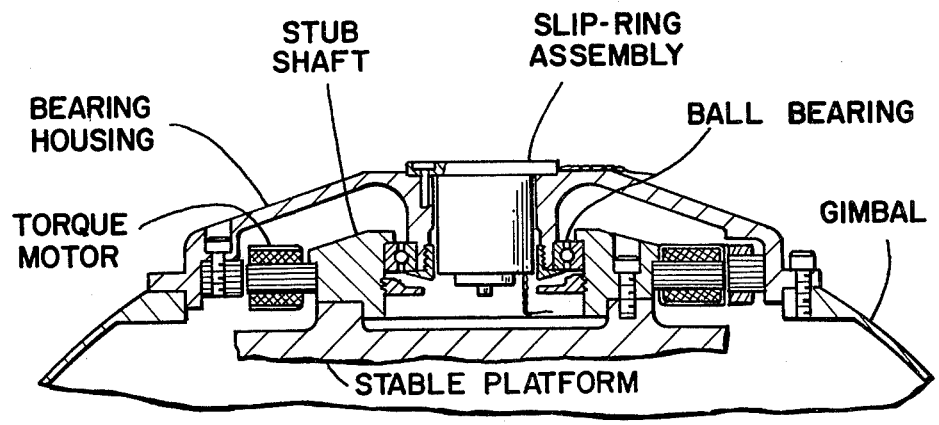
FIG_2 (PRIOR ART)

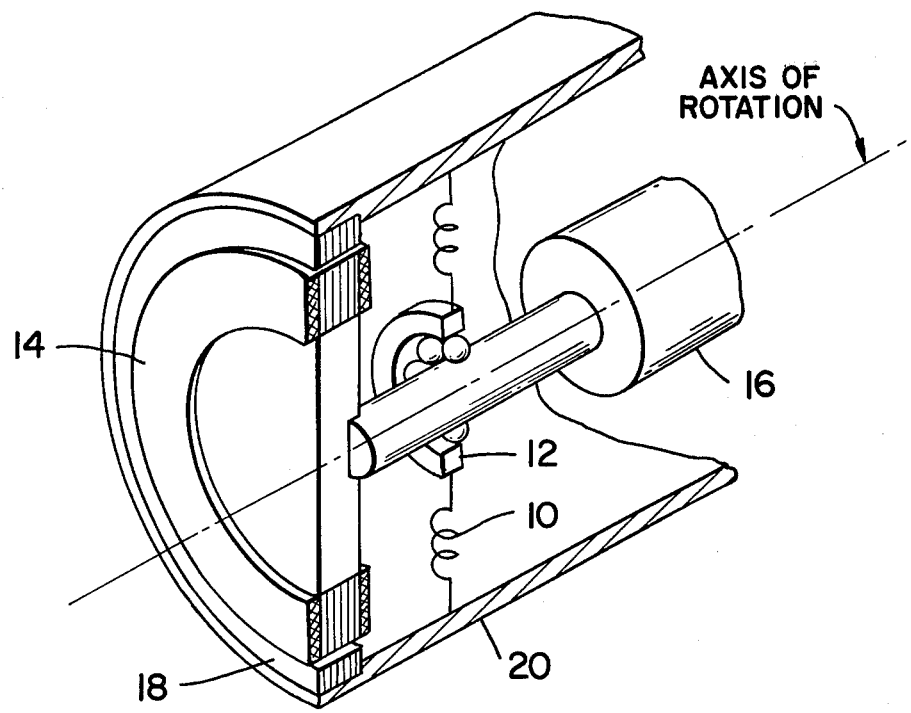
FIG_3
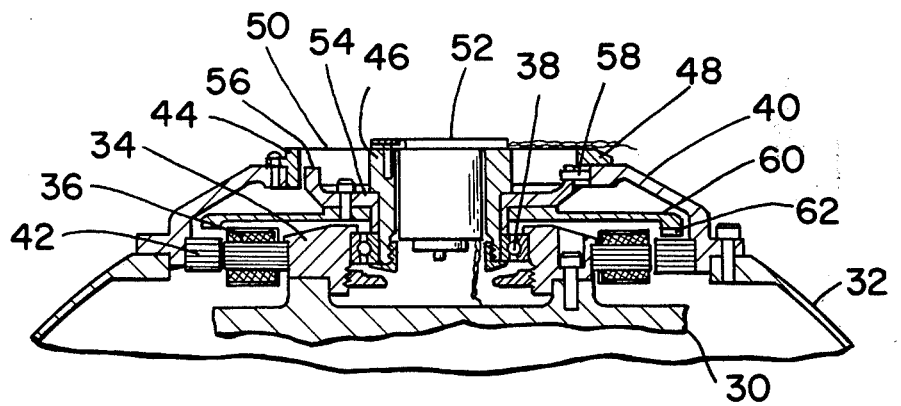
FIG_4

U.S. Patent   Jun. 1, 1982   Sheet 3 of 3   4,332,365
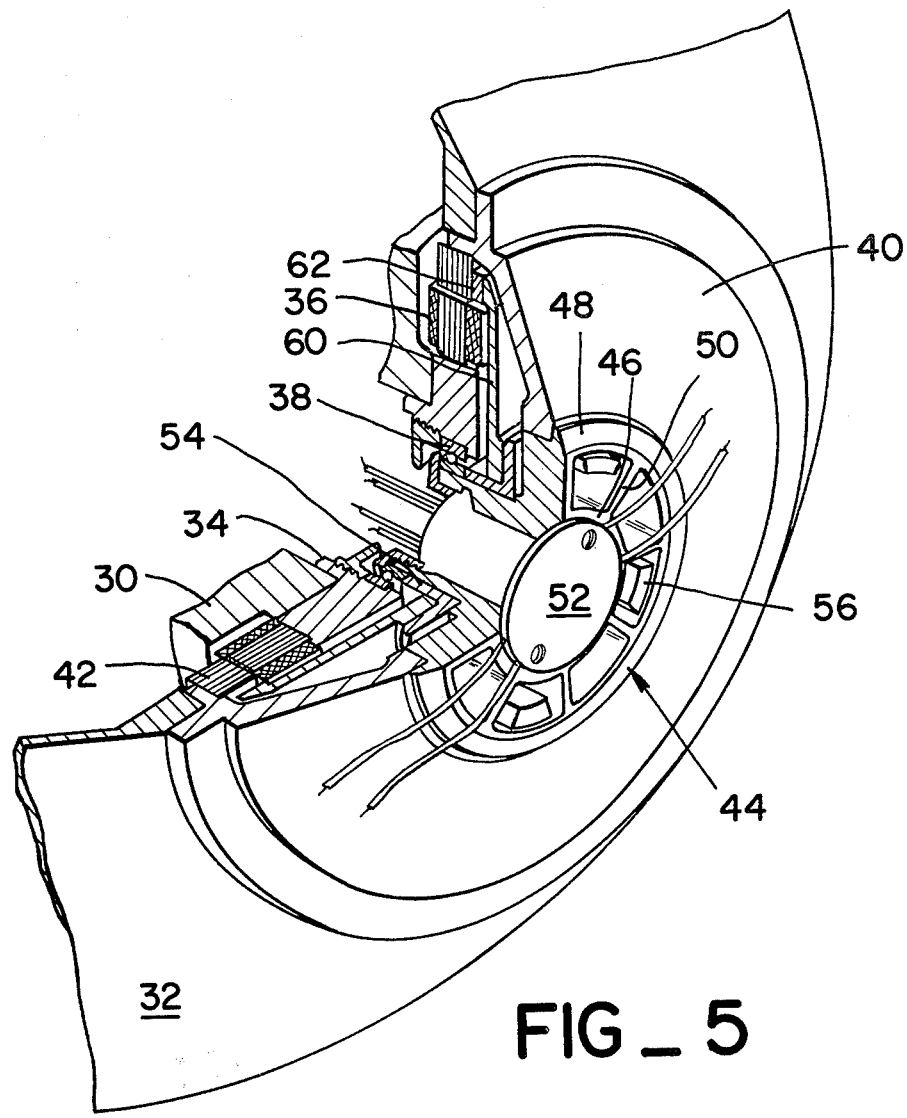
FIG _ 5
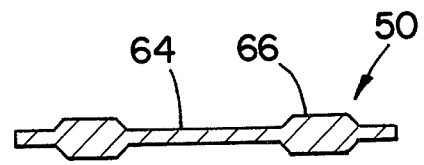
FIG _ 6

FLEXURE MOUNTED GIMBAL SUPPORT ASSEMBLY

BACKGROUND OF THE INVENTION

1. Field of the Invention

The present invention relates to gimbal support assemblies, and more particularly to a flexure mounted gimbal support assembly which provides a low rotational stiffness over limited angles.

2. Description of Prior Art

To improve guidance accuracy inertial measurement units use inertial components which are more sensitive to environmental inputs. To isolate these components from undesirable environmental inputs, maximum base-motion isolation is desired. Traditionally, inertial components are hard mounted on a "stable" platform which can be independently positioned rotationally through the use of gimbals (see FIG. 1). External system vibrations, such as shock pulses, are dampened through shock mounts which reduce translational motion within the system to acceptable limits.

To further improve the stability of the stable platform, base-motion isolation in the rotational sense is needed. A conventional gimbal support bearing assembly is shown in FIG. 2 and has:

- a stub shaft to provide structural attachment to the stable platform;
- a ball bearing to provide rotational support between gimbals;
- a slip-ring assembly to provide electrical power and signal information to and from the inertial components;
- a torque motor to provide driving torque to rotate the gimbals; and
- a bearing housing to provide structural attachment to the gimbal.

The stick-friction behavior of the gimbal support bearings, slip-rings, torque motor brush friction and torque motor magnetic drag are major factors that limit the degree of base-motion isolation. Traditional concepts of eliminating or minimizing bearing friction, such as gas or a liquid fluid, have had the following disadvantages:

- require an external power supply;
- have potential leakage problems;
- require rotary seal joints;
- impose a weight penalty on operational hardware; and
- increase cost.

Another concept, the dual co-axial bearing which provides low friction when the intermediate race is oscillated or rotated, also has the disadvantage of requiring an external power supply to drive the intermediate bearing race. Neither of these concepts solve either the slip-ring or the torque motor friction problems.

Therefore, a device that eliminates or minimizes the stick-friction effects on rotary components without requiring external power sources is desired.

SUMMARY OF THE INVENTION

Accordingly, the present invention provides a flexure mounted gimbal support assembly for limited angular rotation. A flexure assembly of an open web construction is mounted in series between a ball bearing assembly and a gimbal. The resistance to rotational motion of the flexure assembly is less than the static friction of the ball bearing over a preselected angle of rotation. For this preselected angle, the very low rotational resistance of the flexure assembly eliminates the stick-friction drag of the ball bearing. A slip-ring assembly is attached to the inner ring of the flexure assembly, the wire leads being fanned out with a generous service loop. A circular plate also is attached to the inner ring of the flexure assembly to carry the torque-motor brushes. A slotted circular plate is fixed to the inner ring of the flexure assembly and fits between the flexure elements to form an angular limit-stop. Limit-stop pins are contained in the slotted circular plate and are a loose fit with slots in the outer ring of the flexure assembly. The limit-stop pins hold the structural elements together in the event of flexure element breakage to prevent catastrophic failure.

Therefore, it is an object of the present invention to provide a flexure mounted bearing which minimizes or eliminates the effects of stick-friction on rotary components without requiring external power sources.

Another object of the present invention is to provide a flexure mounted bearing which has a direct connection to angle measuring resolvers and direct-drive dc torque motors.

Still another object of the present invention is to provide a flexure mounted bearing which has a fail-safe configuration to prevent catastrophic failure in the event of a flexure element breakage.

Yet another object of the present invention is to provide a flexure mounted bearing which minimizes the possibility of torque motor or resolver bind while providing a heat transfer path from the stable platform to the gimbal assembly.

Other objects, advantages and novel features of the present invention will be apparent from the following detailed description when read in conjunction with the appended claims and attached drawing.

BRIEF DESCRIPTION OF THE DRAWING

FIG. 1 is a schematic diagram of a gimbal system.

FIG. 2 is a cross-sectional view of a prior art gimbal support assembly.

FIG. 3 is a schematic diagram of a flexure mounted bearing.

FIG. 4 is a cross-sectional view of a flexure mounted gimbal support assembly.

FIG. 5 is a perspective partial cross-sectional view of a flexure mounted gimbal support assembly.

FIG. 6 is a cross-sectional view of a non-uniform thickness flexure element.

DESCRIPTION OF THE PREFERRED EMBODIMENT

Referring now to FIG. 3 a flexure mounted support assembly has a plurality of flexure elements 10, represented schematically as springs, in series with a ball bearing assembly 12. A torque motor rotor 14 attached to a device 16 to be rotated, such as a stable platform, reacts with a magnet ring 18 which is attached to a case 20. Base-motion isolation in the rotational sense is achieved by providing a resistance to motion less than the static ball bearing friction over a preselected angle of rotation. The case 20 is allowed to rotate within this limited angle before the ball bearings begin to roll, thus replacing the stick-friction of the ball bearings with a low, linear torsional spring constant.

FIGS. 4 and 5 illustrate the flexure concept as applied to a stable platform 30 which can be independently positioned in a rotational sense by a gimbal 32. A stub shaft 34 is attached to the stable platform 30 and supports a torque motor rotor 36 on the outer circumference and a ball bearing assembly 38 on the inner circumference. A bearing housing 40 is attached to the gimbal 32 and supports a magnet ring 42 in proximity to the torque motor rotor 36 so that when current is applied to the rotor a torque is created which tends to rotate the stable platform 30 within the gimbal.

A flexure assembly 44 is attached between the bearing housing 40 and the ball bearing assembly 38. The flexure assembly 44 is in the form of an open web construction, having an inner ring 46, the base of which is attached to the ball bearing assembly, an outer ring 48 attached to the bearing housing, and a plurality of flexure elements 50 between the inner and outer rings. The flexure elements 50 are typically in the form of flat metal springs, such as a high strength steel or beryllium-copper having a typical thickness of approximately 0.005" to provide a low torsional spring constant.

A slip-ring assembly 52 is attached to the flexure assembly 44 so that the slip-ring assembly is situated within the inner ring 46. The slip-ring assembly 52 provides the electrical power to the torque motor rotor 36 and receives the signal information from the inertial components on the stable platform 30. Also, with the slip-ring assembly 52 mounted inboard of the flexure assembly, slip-ring brush-on-ring friction effects are eliminated since there is no relative motion within the limit angle.

A slotted circular plate 54, having the teeth between the slots upturned, is attached to the inner ring 46 of the flexure assembly 44 so that the teeth project into the open area between the flexure elements 50 to form limit stops 56. A limit-stop pin 58 is secured to the limit stops 56. The limit-stop pins 58 form a loose fit with slots in the flexure outer ring 48. In the event of flexure element breakage the limit-stop pins hold the structural elements together to prevent catastrophic failure. The close-fitting air gap of the circular plate 54 with the flexure assembly 44 is sized to minimize the possibility of torque motor or resolver bind as well as providing a heat transfer path from the stable platform 30 to the gimbal assembly 32.

A circular-brush carrier plate 60 is also affixed to the inner ring 46 of the flexure assembly 44. Torque motor brushes 62 are carried by the circular brush carrier plate 60. The torque motor rotor 36 is electrically energized through these brushes to produce the magnetic field which reacts with the magnet ring 42 to provide the driving torque. Since there is no relative motion between the torque motor brushes 62 and rotor 36 within the limit angle, the gimbal 32 is driven without brush friction.

Structurally, the flexure assembly 44 is designed to satisfy conflicting requirements, i.e., the flexure elements 50 must survive environments that produce high axial and radial loads while providing a low torsional spring constant. Two possible flexure element profiles, uniform thickness or non-uniform thickness, are usable. The uniform thickness profile flexure elements allow the flexure elements to elastically buckle under peak loads with the limit-stop pins 58 acting to "cage" the flexure elements.

A non-uniform profile flexure element 50 is shown in FIG. 6. This flexure element has a thin portion 64 and two rib portions 66 near the ends. Using a high strength steel, such as Vascomax 350, this profile shows a significantly improved torque versus $\theta$ characteristic over the uniform thickness profile flexure element of beryllium copper, i.e., the non-uniform profile eliminates the buckling of the flexure elements under peak load.

Thus, the present invention provides a flexure mounted gimbal support assembly which provides improved base-motion isolation by eliminating the stick-friction effects of the ball bearing assembly as well as providing a direct connection to angle measuring resolvers and direct-drive dc torque motors. The slip-ring brush-on-ring friction effects of the slip-ring assembly and the torque motor brush friction effects also are eliminated since there is no relative motion between components within the limit angle. The result is a threefold improvement in servo performance for flexure excursions within the limit stops over conventionally mounted gimbal assemblies.

What is claimed is:

1. In a gimbal support system of the type including a stable platform for holding inertial components, a torque motor for providing driving torque between the gimbals, the rotor of the torque motor fixed relative to the stable platform and energized by brushes which are not fixed relative to said platform, and a slip ring assembly for enabling external electrical connection to said brushes and inertial components, the improvement being apparatus for rotatably coupling said stable platform to said gimbal, said apparatus minimizing the effects of friction on rotating parts, which comprises:

(a) an antifriction ball bearing having an inner race and an outer race, the outer race of said bearing being rigidly coupled to the inner surface of said rotor and said stable platform;
   (b) an inner ring having its outer surface rigidly coupled to the inner race of said bearing and to said brushes, the aperture of said inner ring being adapted for rotatably supporting said slip ring assembly therein;
   (c) an outer ring concentric with said inner ring having its outer surface rigidly coupled to said gimbal;
   (d) a plurality of flexure elements coupled between the outer surface of said inner ring and the inner surface of said outer ring, said flexure elements allowing relative rotational movement between said inner ring and said outer ring; and
   (e) the resistance to rotational motion provided by said flexure elements being less than the resistance to said motion provided by said bearing for a preselected angle of rotation and less than the resistance to said motion provided by said slip ring assembly for said preselected angle of rotation, whereby there is no relative motion between the brushes and the rotor, between the slip ring assembly and the inner ring, and between the inner race and outer race of the bearing for rotational motion within the preselected angle, thereby minimizing effects of friction for rotational motion within said preselected angle.

2. Apparatus as recited in claim 1 wherein said plurality of flexure elements comprises a plurality of flat metal springs extending radially between said inner ring and said outer ring.

3. Apparatus as recited in claim 2 further including first means for limiting the flexure excursions between inner and outer ring to a specified angular range.

4. Apparatus as recited in claim 3 wherein said first limiting means includes a plate rigidly coupled to a first one of said rings, said plate having teeth which extend into the open spaces between said flexure elements to limit the flexure excursions by contacting said flexure elements.

5. Apparatus as recited in claim 4 further including second means to limit the rotational motion between said inner ring and said outer ring in the event of breakage of said flexure elements, said second limiting means including a pin attached to one of said teeth, said pin fitting loosely in a slot in the ring which is not attached to said plate.

* * * * *